US007533351B2

(12) United States Patent
Bellwood et al.

(10) Patent No.: US 7,533,351 B2
(45) Date of Patent: May 12, 2009

(54) METHOD, APPARATUS, AND PROGRAM FOR DYNAMIC EXPANSION AND OVERLAY OF CONTROLS

(75) Inventors: Thomas Alexander Bellwood, Austin, TX (US); Matthew Francis Rutkowski, Pflugerville, TX (US); Michael John Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 10/639,861

(22) Filed: Aug. 13, 2003

(65) Prior Publication Data

US 2005/0039137 A1    Feb. 17, 2005

(51) Int. Cl.
*G06F 3/048* (2006.01)

(52) U.S. Cl. .................... 715/780; 715/790; 715/225

(58) Field of Classification Search ................ 715/780, 715/790, 802, 505–508, 762–765, 221–226, 715/227–233, 243–244, 255, 517–550, 788, 715/800, 821–824
See application file for complete search history.

(56) References Cited

U.S. PATENT DOCUMENTS

| | | | | | |
|---|---|---|---|---|---|
| 4,763,356 | A | * | 8/1988 | Day et al. | 379/368 |
| 5,459,796 | A | * | 10/1995 | Boyer | 382/187 |
| 5,583,981 | A | * | 12/1996 | Pleyer | 715/800 |
| 5,671,378 | A | * | 9/1997 | Acker et al. | 715/801 |
| 5,712,994 | A | * | 1/1998 | Jefferson et al. | 715/788 |
| 5,875,265 | A | * | 2/1999 | Kasao | 382/229 |
| 5,943,053 | A | * | 8/1999 | Ludolph et al. | 715/790 |
| 6,167,411 | A | * | 12/2000 | Narayanaswamy | 715/541 |
| 6,335,799 | B1 | * | 1/2002 | Provost | 358/1.4 |
| 6,344,865 | B1 | * | 2/2002 | Matthews et al. | 715/815 |
| 6,384,840 | B1 | * | 5/2002 | Frank et al. | 345/634 |
| 6,441,824 | B2 | * | 8/2002 | Hertzfeld | 345/472 |
| 6,448,986 | B1 | | 9/2002 | Smith | 345/801 |
| 6,483,526 | B1 | * | 11/2002 | Merrick | 715/780 |
| 6,604,150 | B1 | * | 8/2003 | Gebhart et al. | 719/328 |
| 6,654,038 | B1 | * | 11/2003 | Gajewska et al. | 715/802 |
| 6,714,220 | B2 | * | 3/2004 | Sigl | 715/780 |
| 6,928,623 | B1 | * | 8/2005 | Sibert | 715/783 |
| 7,307,647 | B2 | * | 12/2007 | Hatori et al. | 345/698 |

(Continued)

OTHER PUBLICATIONS

Blenkhorn, et al., "Full-Screen Magnification for Windows using DirectX Overlays", IEEE Transactions on Neural Systems and Rehabilitation Engineering, vol. 10, No. 4, pp. 225-231.

*Primary Examiner*—Tadeese Hailu
(74) *Attorney, Agent, or Firm*—Yee & Associates, P.C.; Justin M. Dillon

(57) ABSTRACT

A set of replacement system window controls is provided that are instantiated as the result of the receipt of create control messages into the system message queue, instead of the built-in system window controls. The replacement window controls result in replacement control instances being created with modified properties based on user preferences. The replacement system window control instances may also include an overlay function. In response to a set focus message, a replacement control instance may create an overlay control that is displayed over the replacement control. The overlay control itself can have modified properties and may be enlarged or relocated. When the overlay control receives a release focus message, the overlay control passes its state back to the replacement control and is destroyed.

25 Claims, 8 Drawing Sheets

U.S. PATENT DOCUMENTS

| | | | |
|---|---|---|---|
| 2002/0070973 A1* | 6/2002 | Croley | 345/780 |
| 2002/0147744 A1* | 10/2002 | Smith et al. | 707/507 |
| 2002/0154146 A1 | 10/2002 | Rodriquez et al. | 345/660 |
| 2002/0180792 A1* | 12/2002 | Broussard | 345/764 |
| 2003/0001892 A1* | 1/2003 | Hartel et al. | 345/762 |
| 2003/0046401 A1 | 3/2003 | Abbott et al. | 709/228 |
| 2003/0058280 A1* | 3/2003 | Molinari et al. | 345/771 |
| 2003/0068088 A1* | 4/2003 | Janakiraman et al. | 382/229 |
| 2004/0008228 A1* | 1/2004 | Smith | 345/780 |
| 2004/0036718 A1* | 2/2004 | Warren et al. | 345/744 |
| 2004/0165009 A1* | 8/2004 | Blakely et al. | 345/801 |
| 2004/0210853 A1* | 10/2004 | Detter | 715/864 |
| 2006/0230357 A1* | 10/2006 | Esque | 715/777 |

* cited by examiner

☐ WARNING!

First Name:  Last Name:

Address:

Address Line 2 (Optional):

City:  State:  Zip:

Home Phone:  Work Phone:

Gender:  Age:  Marital Status:

☐ WARNING!

612— First Name:  Last Name:

Address:

First Name:  *622*

Home Phone:  Work Phone:

Gender:  Age:  Marital Status:

METHOD, APPARATUS, AND PROGRAM FOR DYNAMIC EXPANSION AND OVERLAY OF CONTROLS

BACKGROUND OF THE INVENTION

1. Technical Field

The present invention relates to data processing systems and, in particular, to message based windowing systems. Still more particularly, the present invention provides a method, apparatus, and program for dynamic expansion and overlay of controls in a message based windowing system.

2. Description of Related Art

Users with vision impairment require mechanisms for increasing their ability to read and recognize content on a computer screen or similar presentation device. Existing methods include system enlargement of fonts and magnification utilities that enlarge selected content on the screen. Both of these solutions have disadvantages.

A side effect of increasing system fonts is that the amount of viewable content on the screen is reduced. Furthermore, the layout of presentation controls may be degraded, since applications are often designed for more common font sizes.

In the case of magnification utilities, the user may be forced to accept degraded, i.e. pixilated, text and graphics presentation for the magnified area. This results in loss of clarity and may reduce recognition of graphical content. Magnifiers also require overt action on the part of the user in order to direct and control the magnified area.

Even for those without significant vision impairment, it may often be difficult to read a particular part of a form. For example, in low light situations or in cases where high screen resolutions are preferred, presentation size of on-screen controls may be reduced.

Therefore, it would be advantageous to provide a mechanism for improving recognition and readability of screen content.

SUMMARY OF THE INVENTION

The present invention provides a set of replacement system window controls that are registered with the host operating system to receive "create" window control messages intended for the built-in system window controls. The set of replacement controls may be a 1:1 mapping to the built-in system window controls (e.g., replacing a radio button type control with another radio button type control). In response to a create message, the operating system would then create an instance of the replacement window control instead of the built-in window control. Afterwards, all subsequent window messages would then be processed by the replacement controls.

Along with the replacement system window controls, a set of user preferences may be established in the system that describe the desired appearance, presentation, and behavior of the replacement controls. The replacement control would then appear the same as the original system control when created. Alternatively, a subset of the user preferences may be used to alter the presentation of the replacement control (inline).

When a replacement control receives a "set focus" message, the replacement control may create an overlay window control that would be superimposed on the replacement control and apply user preferences that alter the presentation of the overlay control to increase accessibility. The overlay control, in order to make it more accessible, may be enlarged and/or relocated and may have altered typeface, font effects, colors, etc. When the overlay control receives a "release focus" message, the overlay control passes its state, including contents, back to the replacement control and is then destroyed by the replacement control.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-5C and 6A-6D are example screens of display in a windowing environment in accordance with a preferred embodiment of the present invention;

DETAILED DESCRIPTION OF THE PREFERRED EMBODIMENT

Figure 1:
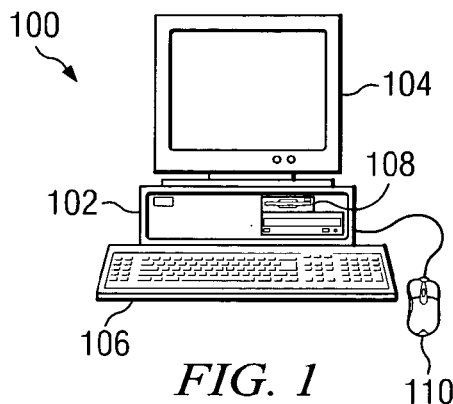
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

A graphical user interface may present textual and graphical controls on video display terminal 104. However, users with vision impairment require mechanisms for increasing their ability to read and recognize content on a computer screen or similar presentation device. Even for users without significant vision impairment, it may often be difficult to read a particular part of a form.

In accordance with a preferred embodiment of the present invention, a set of replacement system window controls is provided. The replacement window controls may receive a message to create a graphical or textual control and generate an instance of a replacement control with at least one modified property. Alternatively, the replacement controls may receive an input message, such as a set focus message, that indicates that a control is of interest to the user. The replacement control may then create an overlay control with at least one modified property and superimpose the overlay control over the replacement control of interest. The replacement controls and/or overlay controls may also be created with a modified location. For example, an overlay control may be displayed in the center of the screen.

Figure 2:
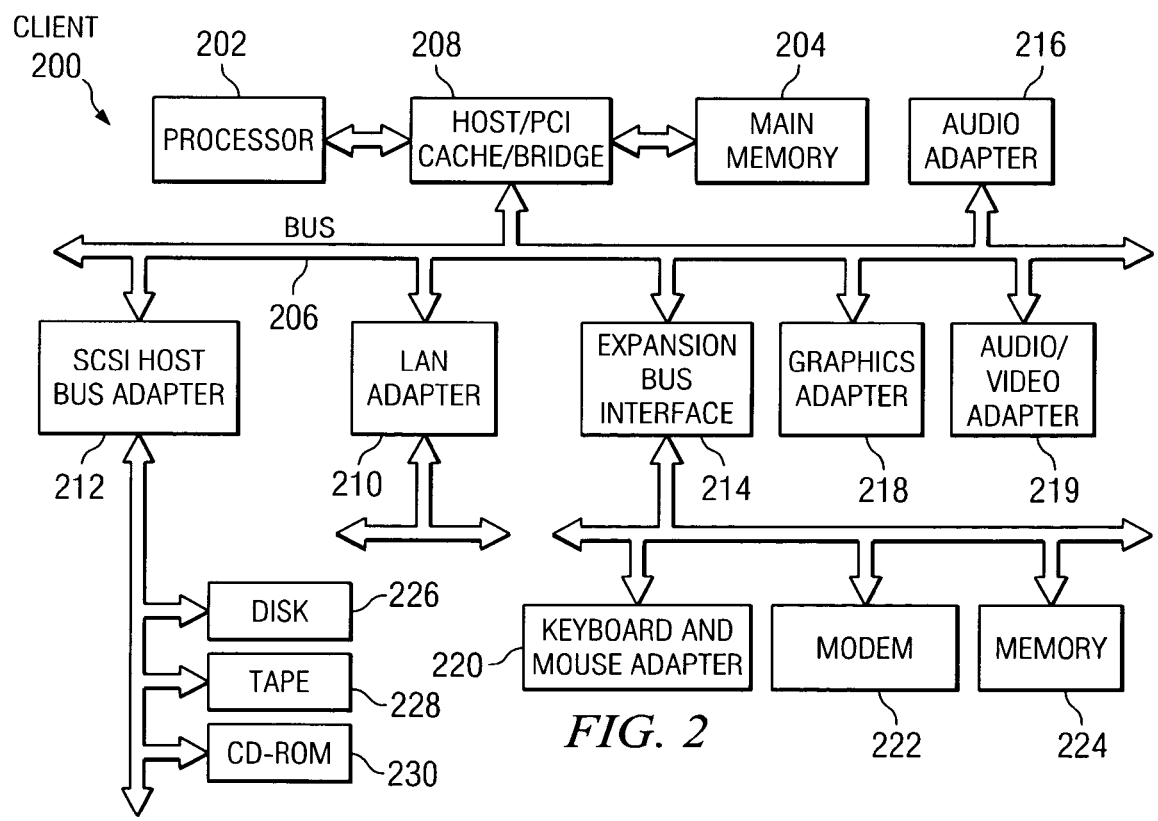
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA, cellular telephone, or any other small form factor device. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3A:
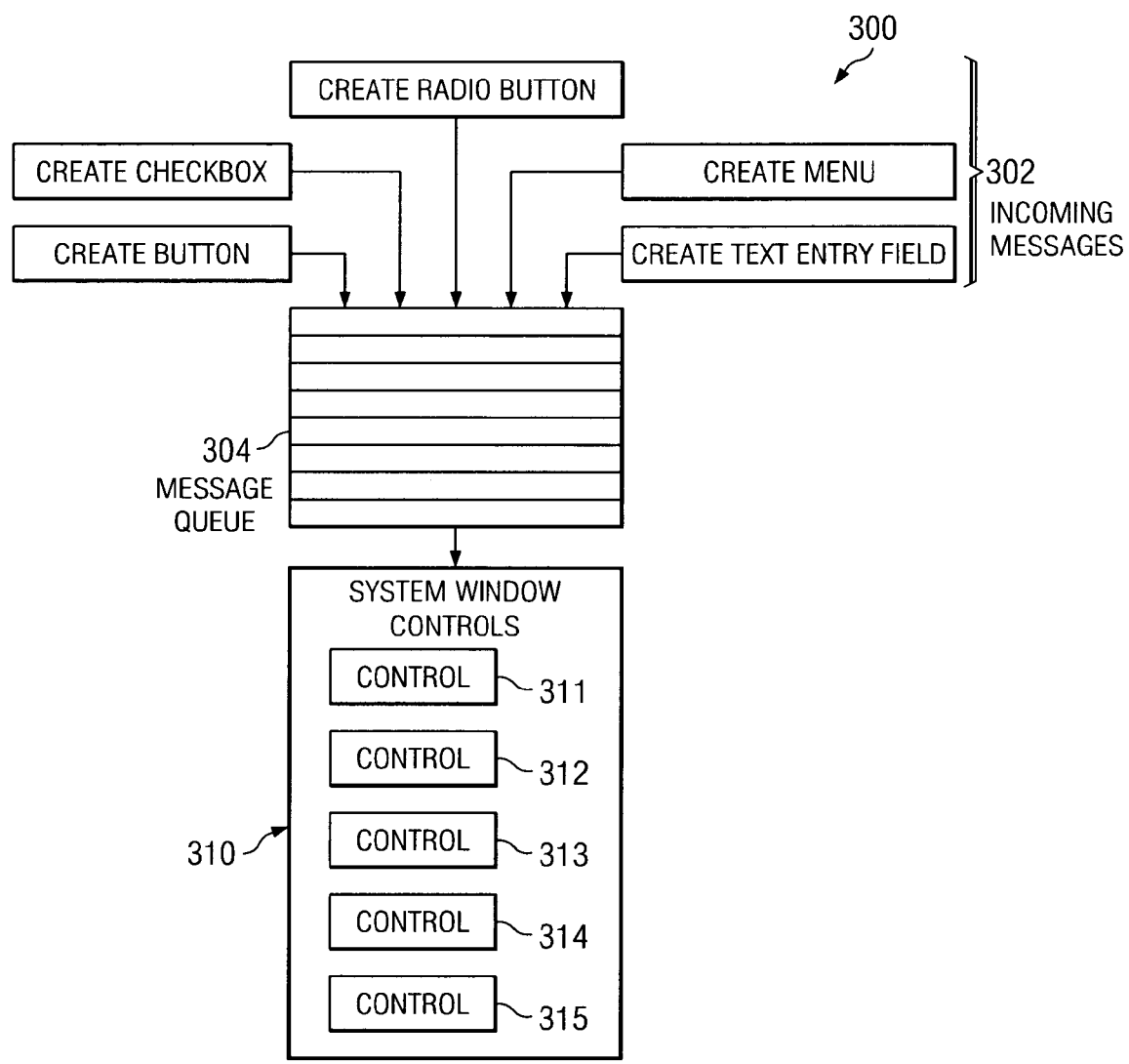
FIGS. 3A and 3B illustrate a message based windowing system in accordance with a preferred embodiment of the present invention.
Figure 3B:
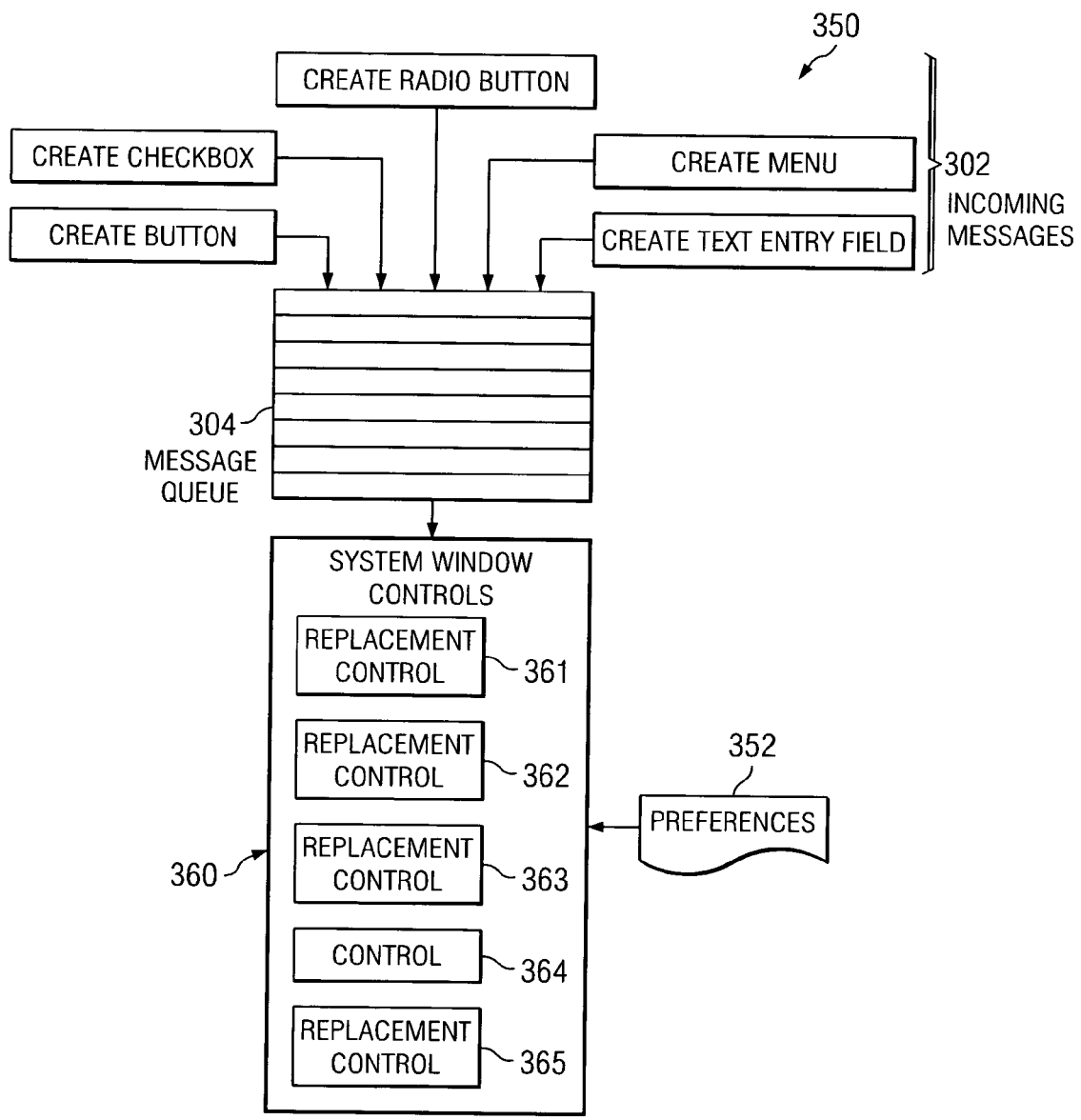

With reference to FIGS. 3A and 3B, a message based windowing system is illustrated in accordance with a preferred embodiment of the present invention. Many windowing systems are driven by event messages. These message based windowing systems do not make explicit function calls to obtain input. Instead, they wait for the system to pass input to them. The system passes all input for an application to the various windows in the application. The system calls a window control whenever it has input for the window. The window control processes the input and returns control to the system.

As demonstrated in FIG. 3A, message based windowing system 300 receives a plurality of incoming messages 302. Whenever the user moves the mouse, clicks the mouse buttons, or types on the keyboard, the device driver for the mouse or keyboard converts the input into messages and places them in message queue 304. Incoming messages 302 include a "Create Button" message, a "Create Checkbox" message, a "Create Radio Button" message, a "Create Menu" message, and a "Create Text Entry Field" message. Responsive to receiving create messages, the windowing system creates a corresponding system window control, such as a button, checkbox, radio button, menu, or text entry field. The windowing system may include more or fewer controls, depending upon the implementation. For example, a specialized computing device, such as an automated teller machine or television device may include only a subset of the known window controls.

The system removes the create messages, one at a time, from the system message queue and processes them by creating the built-in system window controls 310. The code for these window controls serves as templates for creating control instances. In the depicted example, the built-in system window controls include controls 311-315, which may correspond directly with incoming messages 302 described above. The built-in system window controls are referred to herein as window controls; however, the name for this code, as well as the specific implementation, may vary depending on the windowing system. System messages, such as those for creating controls, typically result in the creation of system window controls. After controls are created, messages are handled by the controls themselves. For example, mouse click and key down messages are handled by the window control for the application with focus.

In a message based windowing system, a current control, such as a window, menu, or dialog box, is said to "have focus." That is, the control with focus receives all input messages, such as key strokes or mouse movement messages. For example, after a user clicks from a first window to a second window, the second window is said to "have the focus."

FIG. 3B illustrates a message based windowing system with enhanced replacement window controls in accordance with a preferred embodiment of the present invention. A subset of the system window controls 360 in windowing system 350 may be replaced with replacement system window controls 361, 362, 363, and 365. The replacement controls are registered with the windowing system 350, and then act as templates such that create messages result in the creation of replacement window controls, rather than the default system window controls. In the depicted example, control 364 is not replaced. Rather, control 364 is an original built-in system window control. However, any subset of the system window controls 360 may be replaced within the scope of the present invention. For example, the message based windowing system of the present invention may replace every system window control or only one or two controls of interest, depending upon the implementation.

User preferences for display properties are stored in preferences 352. When the windowing system of the present invention receives a create message to create a graphical or textual control, an instance of a replacement control may be created. The replacement control may have one or more modified properties. For example, a replacement control may enlarge fonts for users with vision impairment, alter colors for users with color blindness, provide sound or animation, or perform other property modifications based upon preferences 352.

In an alternative embodiment, the windowing system of the present invention may create a replacement control that includes an overlay function. If the replacement control is to be resized or relocated, then the windowing system modifies the replacement control so that the replacement control creates an overlay control responsive to a set focus message. The overlay function in the replacement control may then create an overlay control with at least one modified property and present the overlay control over the replacement control. For example, the overlay control may be presented larger or in the center of the screen.

FIGS. 4A-4D are block diagrams illustrating the operation of a message based windowing system in accordance with a preferred embodiment of the present invention. More particularly, with reference to FIG. 4A, the system window controls 410 is a representation of the set of all window controls installed on the system. As a response to the "create button" message being received into the "system message queue" 350, the windowing system creates an instance of replacement button control 411 with one or more modified properties based on the user preferences. The create message may include properties or attributes for the control, such as size, location, textual content, and the like.

Preferences may indicate, for example, that the button should be created with an increased size, with a more legible font, or with bold typeface to increase legibility. For example, the create button message may specify as an attribute that text is to be displayed in a "Script" font. However, the user may have difficulty reading this font. Therefore, the preferences may indicate that "Script" font should be replaced with "Courier" font. In this example, the replacement control instance is created with the attribute of "Courier" font in accordance with the user preferences. On the other hand, the preferences may designate preferences of a user that are not based on legibility or visibility, such as a favorite color or font.

In an alternative embodiment, the windowing system of the present invention may be implemented such that certain attributes designated in a create message are not to be overridden by the replacement control. For example, if user preferences dictate that button controls are to be created with a 14-point font and the create message designates a 16-point font, then the instance of the replacement control may simply have a 16-point font as designated in the create message. Thus, it may happen that the replacement control instance will be created with no modified properties based on the user preferences.

Figure 4A:
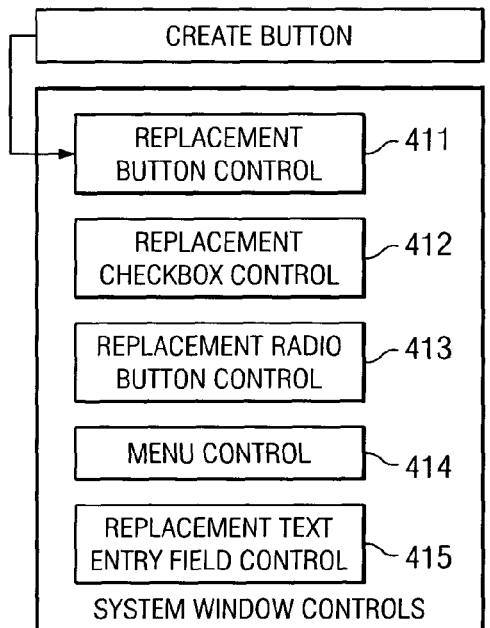
FIGS. 4A-4D are block diagrams illustrating the operation of a message based windowing system in accordance with a preferred embodiment of the present invention.
Figure 4B:
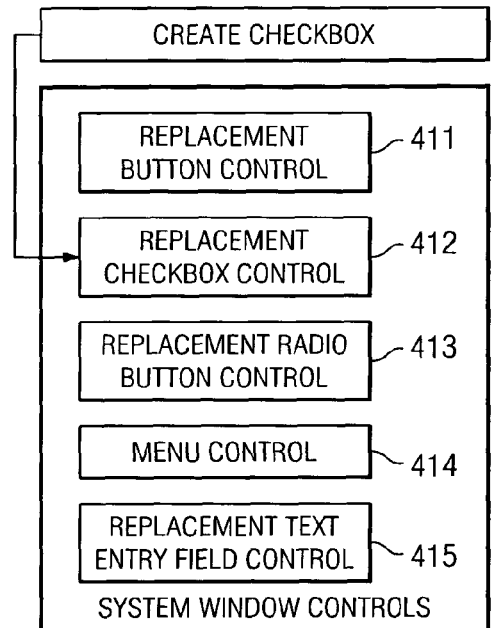

With reference now to FIG. 4B, in response to a "Create Checkbox" message being received into the "system message queue" 350, the windowing system creates an instance of a replacement checkbox control 412 with one or more modified properties based on the user preferences. The create message may include properties or attributes for the control, such as size, location, textual content, and the like. Create messages may be handled in a similar manner for replacement radio button control 413 and replacement text entry field control 415.

Figure 4C:
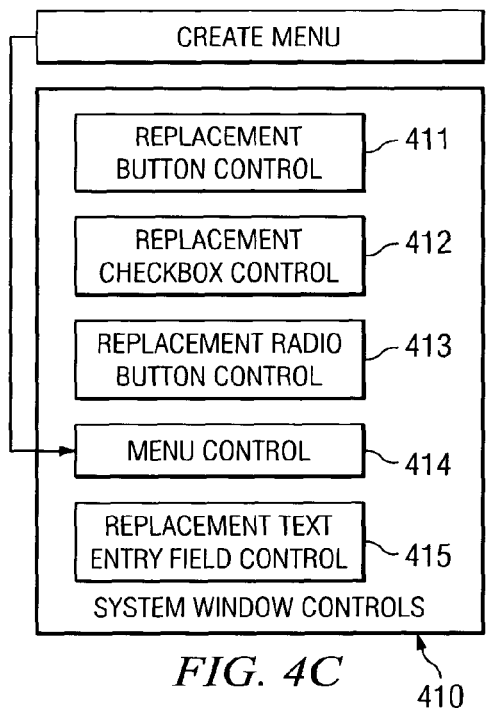

Turning to FIG. 4C, a "Create Menu" message is received. In this example, menu control 414 is not replaced with an enhanced replacement control. Therefore, the menu control instance will be created with properties set forth in the create message and in accordance with default properties.

Figure 4D:
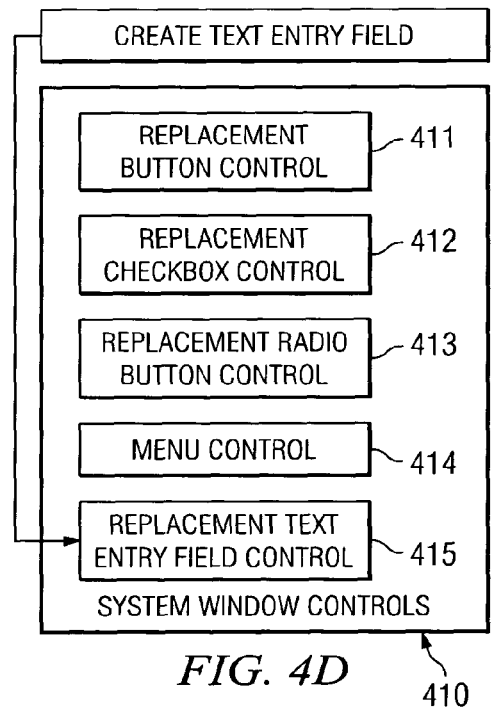

In an alternative embodiment, a replacement control instance may also include an overlay function. As shown in FIG. 4D, a "Create Text Entry Field" message is received into the "system message queue" 350, the windowing system creates an instance of replacement Text Entry control 415 with one or more modified properties based on the user preferences. The create message may include properties or attributes for the control, such as size, location, textual content, and the like.

In accordance with a preferred embodiment of the present invention, the replacement text entry field control 415 also includes an overlay function. When the replacement control instance receives set focus message, the overlay function generates an overlay control. The overlay control is typically created with one or more modified properties and is presented over the replacement control, i.e., the z-order of the overlay control assures that it is presented on top of the replacement control to which it corresponds. For example, the overlay control may be presented larger or in the center of the screen. The overlay function then passes the state of the replacement control instance to the overlay control and gives focus to the overlay control.

In alternative embodiment, a replacement control may create an overlay control in response to other input messages. For example, a control with a small font may create an overlay control with a large font in response to a "mouseover" message or a button click message. In these examples, the behavior of the replacement control is modified such that the replacement control creates an overlay control and passes its state and focus to the overlay control in response to a predetermined input message. It should be noted in the preferred embodiment that only one replacement control will have an overlay control active at any one time, since only one control can have focus in typical windowing messaging systems.

Example screens of display in a windowing environment are shown in FIGS. 5A-5C and 6A-6D in accordance with a preferred embodiment of the present invention. More particularly, with reference to FIG. 5A, window 500 includes title bar 502, which may display the name of the application program. Title bar 502 also includes a control box 504, which produces a drop-down menu (not shown) when selected with the mouse, and "minimize" button 506, "maximize" or "restore" button 508, and "close" button 510. The "minimize" and "maximize" or "restore" buttons 506 and 508 determine the manner in which the program window is displayed. In this example, the "close" button 510 produces an "exit" command when selected. The drop-down menu produced by selecting control box 504 includes commands corresponding to "minimize," "maximize" or "restore," and "close" buttons, as well as "move" and "resize" commands.

Window 500 also includes radio buttons 512 and buttons 514, 516. Window 500, title bar 502, control box 504, radio buttons 512, buttons 506-510, and buttons 514, 516 are all examples of controls in a windowing environment. The replacement system window controls may result in replacement control instances being created for any of the above controls.

Figure 5A:
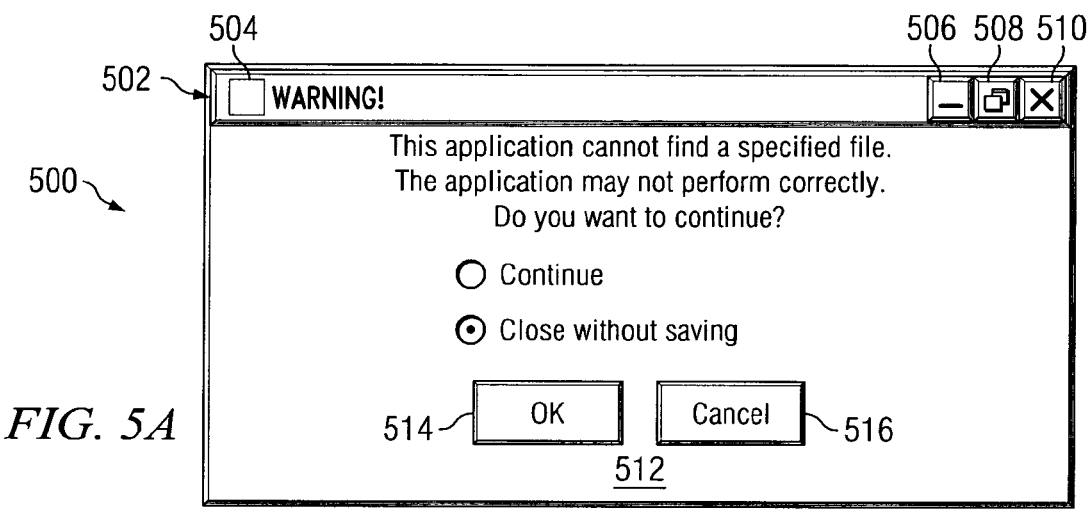
Figure 5B:
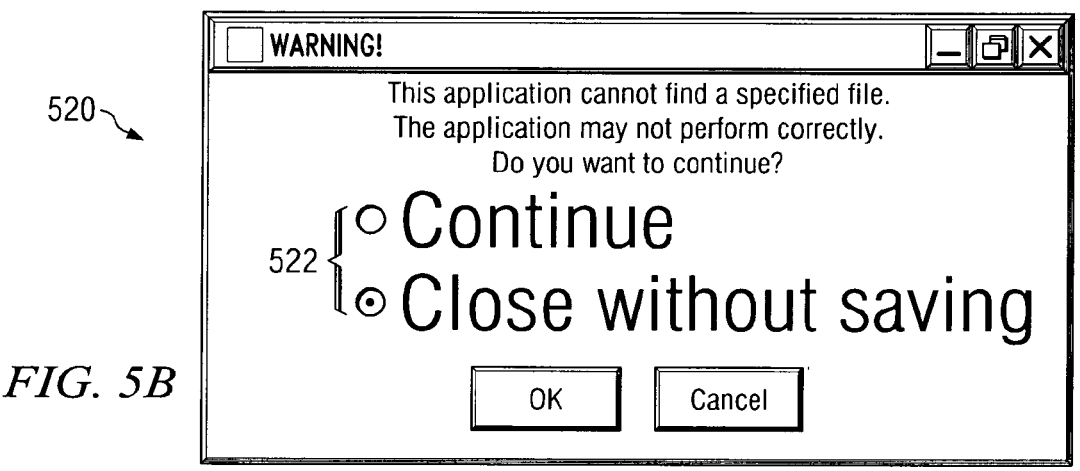
Figure 5C:
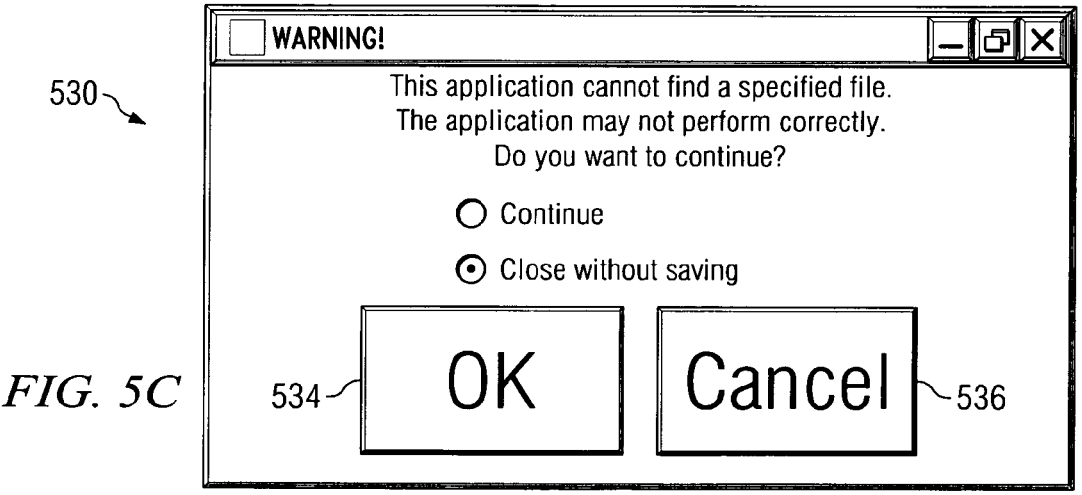

FIG. 5B illustrates window 520 with replacement controls 522, which are created in place of radio buttons 512. Replacement controls 522 are created with at least one modified property, shown as increased font size. FIG. 5C illustrates window 530 with replacement controls 534, 536, which are created in place of buttons 514, 516. Button controls 534, 536 are created with increased size.

FIG. 6A illustrates window 600 with a plurality of text input fields 602. In this example, the text input fields may be difficult to read and interact with, due to screen size or resolution. For example, a user may find it difficult to interact with an interface displayed on a hand held computer, PDA, or telephone device with numerous text input fields. Therefore, user preferences may dictate that overlay controls be created for text input fields and that the overlay controls be resized and relocated for easier manipulation.

With reference to FIG. 6B, window 610 includes text input field 612 with focus. When the window is initially created, each text input field control is created as a replacement control with an overlay function. Thus, when text input field 612, which is a replacement control instance, receives a set focus message, the overlay function of control 612 creates overlay control 622. The overlay function passes the state of replacement control 612 to the overlay control and gives focus to the overlay control. In response to focus being given to the overlay control, replacement control 612 no longer has focus, because only one control may have focus at any one time.

Figures 6C, 6D:
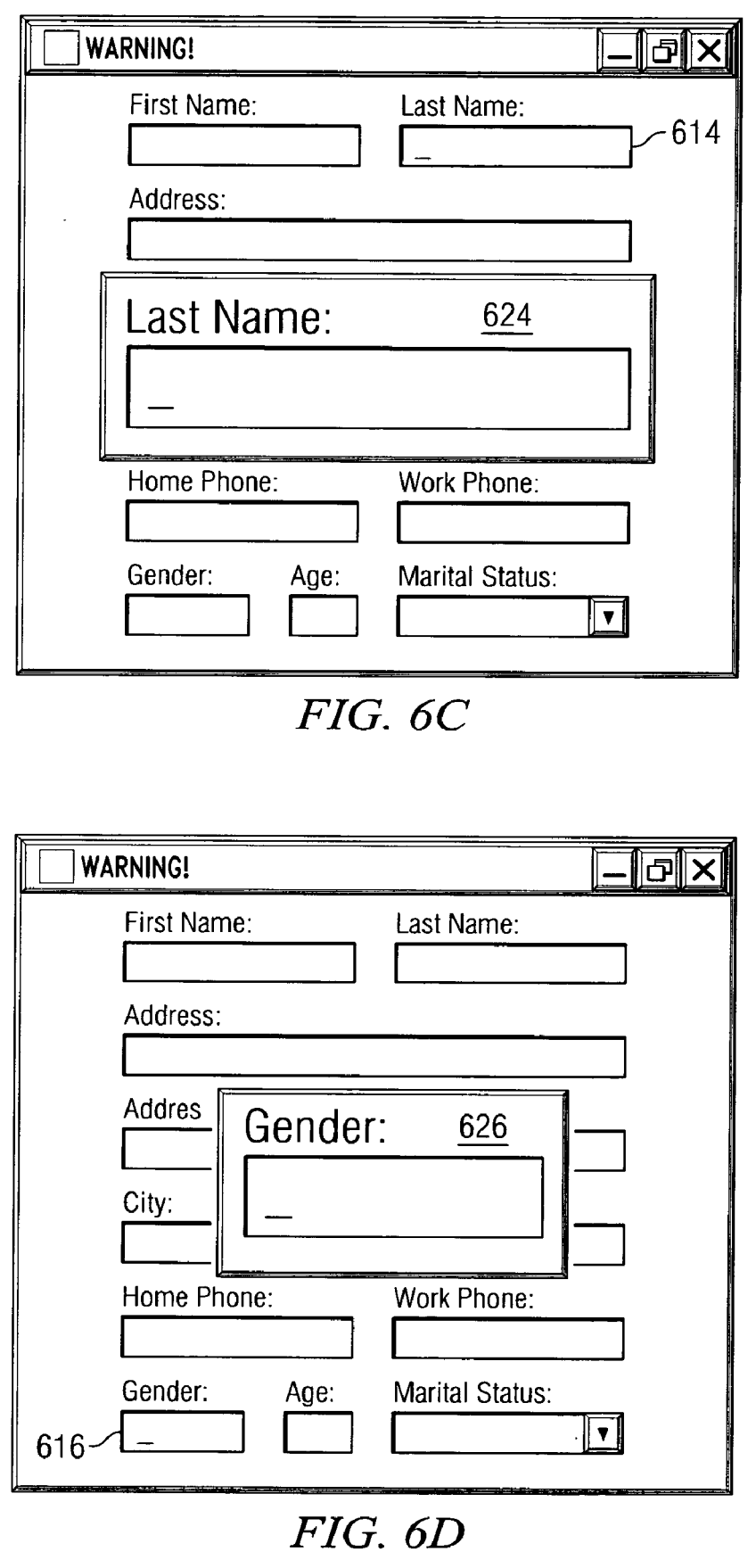

FIG. 6C illustrates the window in which replacement text input field 614 gets focus. Overlay control 622 returns its state to replacement control 612 and is destroyed. The overlay function of replacement control 614 then creates overlay control 624. The overlay function passes the state of replacement control 614 to the overlay control 624 and gives focus to the overlay control. In response to focus being given to overlay control 624, replacement control 614 no longer has focus, because only one control may have focus at any one time.

Turning now to FIG. 6D the window is shown with replacement text input field 616 receiving focus. Overlay control 624 returns its state to replacement control 614 and is destroyed. The overlay function of replacement control 616 then creates overlay control 626. The overlay function passes the state of replacement control 616 to the overlay control 626 and gives focus to the overlay control. In response to focus being given to overlay control 626, replacement control 616 no longer has focus, because only one control may have focus at any one time.

Overlay controls 622, 624, 626 are created with increased size and can be relocated to increase accessibility, such as to the center of the screen in accordance with user preferences. Each time the focus shifts to another replacement control that has an overlay function activated, a new overlay control is created. Overlay controls may also have other modified properties, such as modified typeface, increased font, or the like. It should also be noted that preferably only one control can have focus; therefore, only one replacement control will have an overlay control active at any one time.

Figure 7:
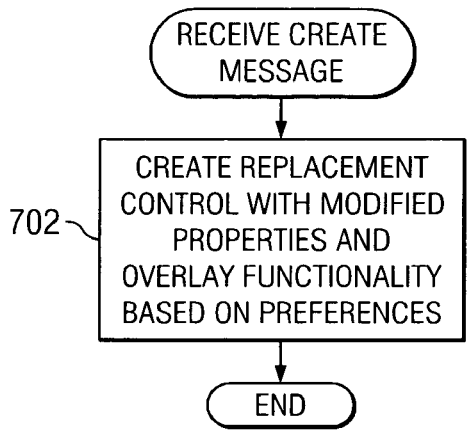
FIG. 7 is a flowchart illustrating the operation of a replacement system window control in accordance with a preferred embodiment of the present invention.

FIG. 7 is a flowchart illustrating the operation of a replacement system window control in accordance with a preferred embodiment of the present invention. The process begins by receiving a create message. The windowing system creates a replacement control with modified properties and/or overlay functionality based on user preferences (step 702) and the process ends.

Figure 8:
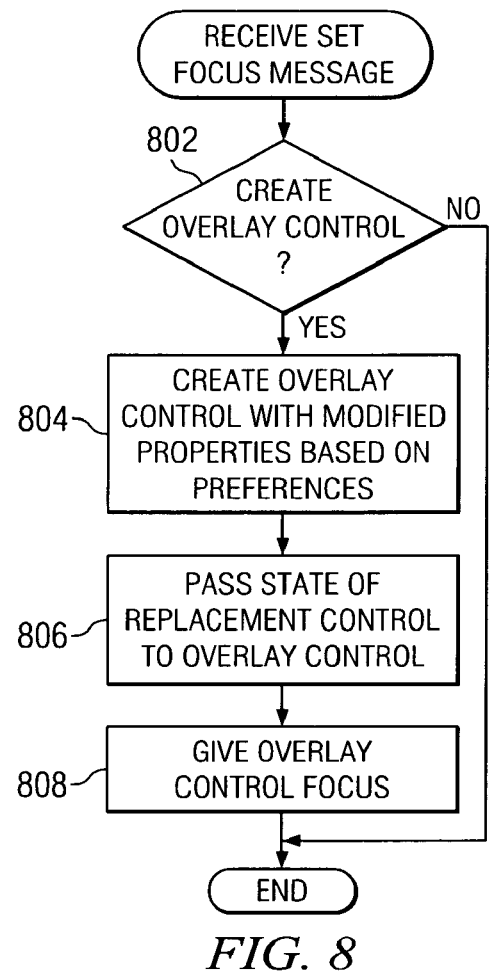
FIG. 8 is a flowchart illustrating the operation of an overlay function in accordance with a preferred embodiment of the present invention.

With reference now to FIG. 8, a flowchart is shown illustrating the operation of an overlay function in accordance with a preferred embodiment of the present invention. The process begins when a replacement control instance with an overlay function receives a set focus message. A determination is made as to whether an overlay control is to be created (step 802). This determination may be made, for example, by determining whether the user preferences dictate that an overlay control is to be created.

If an overlay control is to be created, the process creates an overlay control with modified properties based on user preferences (step 804). Then, the process passes the state of the replacement control to the overlay control (step 806). Thereafter, the process gives focus to the overlay control (step 807) and ends. If an overlay control is not to be created in step 802, the process ends.

Figure 9:
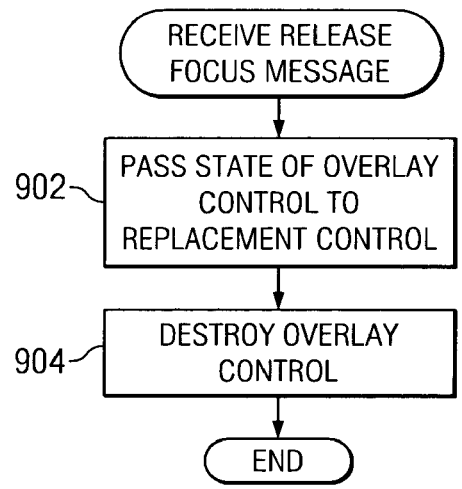
FIG. 9 is a flowchart illustrating the operation of an overlay control in accordance with a preferred embodiment of the present invention.

Turning to FIG. 9, a flowchart illustrating the operation of an overlay control is depicted in accordance with a preferred embodiment of the present invention. This process is only performed in the case where an overlay control is created and an overlay control currently has focus. The process begins when an overlay control receives a release focus message. The process passes the state of the overlay control to the replacement control (step 902). Then, the process destroys the overlay control (step 904) and ends.

FIGS. 8 and 9 illustrate by example that overlay controls are created and destroyed in response to a set focus message or a release focus message. However, in an alternative embodiment the overlay functionality of replacement controls may create an overlay control responsive to other input messages, such as a mouseover message, a button click message, or the like.

Thus, the present invention solves the disadvantages of the prior art by providing a set of replacement system window controls that receives create control messages. The replacement system window controls result in replacement control instances being created with modified properties based on user preferences. In response to a set focus message, a replacement control may create an overlay control that is displayed over the replacement control instance. The overlay control may be enlarged or relocated. The replacement controls of the present invention provide a relatively non-intrusive mechanism for modifying control properties. User preferences may be set in a control panel or the like. Replacement controls may be presented to improve legibility and visibility or simply based on user preferences. Since the windowing system itself creates the modified controls, the graphics are not degraded, i.e. pixelated, as with prior art magnifiers. The creation of replacement controls also requires no overt action on the part of the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for expansion of controls, the method comprising:
   loading a set of system window controls, wherein a set of replacement controls is loaded in place of corresponding system window controls;
   responsive to a create message to create a given control, creating an instance of a replacement control from within the set of system window controls for the given control;
   wherein, responsive to a given input message, the instance of the replacement control creates an overlay control; and
   displaying the replacement control and the overlay control on a display.

2. The method of claim 1, wherein the overlay control is an overlaid instance of the replacement control with one or more modified properties.

3. The method of claim 2, wherein the one or more modified properties are modified based on user preferences.

4. The method of claim 2, wherein the one or more modified properties include at least one of increased font size, modified font typeface, increased control size, and modified color.

5. The method of claim 1, wherein the given input message is a set focus message.

6. The method of claim 1, wherein the instance of the replacement control passes a state of the instance of the replacement control to the overlay control.

7. The method of claim 6, wherein the overlay control returns its state to the instance of the replacement control responsive to a release focus message.

8. The method of claim 7, wherein the overlay control is destroyed responsive to the release focus message.

9. The method of claim 1, wherein the overlay control is resized or relocated on the screen.

10. The method of claim 1, wherein a replacement control within the set of replacement controls provides sound or animation.

11. The method of claim 1, wherein the instance of the replacement control has one or more modified properties.

12. The method of claim 1, wherein the overlay control has one or more modified properties.

13. An apparatus for expansion of controls, the apparatus comprising:
    means for loading a set of system window controls, wherein a set of replacement controls is loaded in place of corresponding system window controls;
    means, responsive to a create message to create a given control, for creating an instance of a replacement control from within the set of system window controls for the given control;
    wherein, responsive to a given input message, the instance of the replacement control creates an overlay control; and
    a display, wherein the display displays the replacement control and the overlay control.

14. A computer program product for expansion of controls, the computer program product comprising:
    wherein the computer program product is stored on a computer readable, recordable-type medium having computer-usable program code;
    instructions for loading a set of system window controls, wherein a set of replacement controls is loaded in place of corresponding system window controls;
    instructions, responsive to a create message to create a given control, for creating an instance of a replacement control from within the set of system window controls for the given control;
    wherein, responsive to a given input message, the instance of the replacement control creates an overlay control; and
    instructions for displaying the replacement control and the overlay control on a display.

15. The computer program product of claim 14, wherein the overlay control is an overlaid instance of the replacement control with one or more modified properties.

16. The computer program product of claim 15, wherein the one or more modified properties are modified based on user preferences.

17. The computer program product of claim 15, wherein the one or more modified properties include at least one of increased font size, modified font typeface, increased control size, and modified color.

18. The computer program product of claim 14, wherein the given input message is a set focus message.

19. The computer program product of claim 14, wherein the instance of the replacement control passes a state of the instance of the replacement control to the overlay control.

20. The computer program product of claim 19, wherein the overlay control returns its state to the instance of the replacement control responsive to a release focus message.

21. The computer program product of claim 20, wherein the overlay control is destroyed responsive to the release focus message.

22. The computer program product of claim 14, wherein the overlay control is resized or relocated on the screen.

23. The computer program product of claim 14, wherein a replacement control within the set of replacement controls provides sound or animation.

24. The computer program product of claim 14, wherein the instance of the replacement control has one or more modified properties.

25. A message based windowing system, in a data processing system, the message based windowing system comprising:
- a message queue;
- a set of system window controls, wherein the system window controls receive system messages from the message queue; and
- a set of replacement window controls registered to receive create messages intended for at least a subset of the system window controls,
- wherein, responsive to receiving a create message from the message queue, the message based windowing system creates an instance of a replacement window control from within the set of replacement window controls having one or more modified properties;
- wherein, responsive to a given input message, the instance of the replacement control creates an overlay control; and
- a display, wherein the display displays the replacement control and the overlay control.

* * * * *